INVENTORS.
ENOCH SKIRVIN
WALTER W. SKIRVIN
PAUL G. SKIRVIN
BY *Kimmel, Crowell & Weaver*
ATTORNEYS.

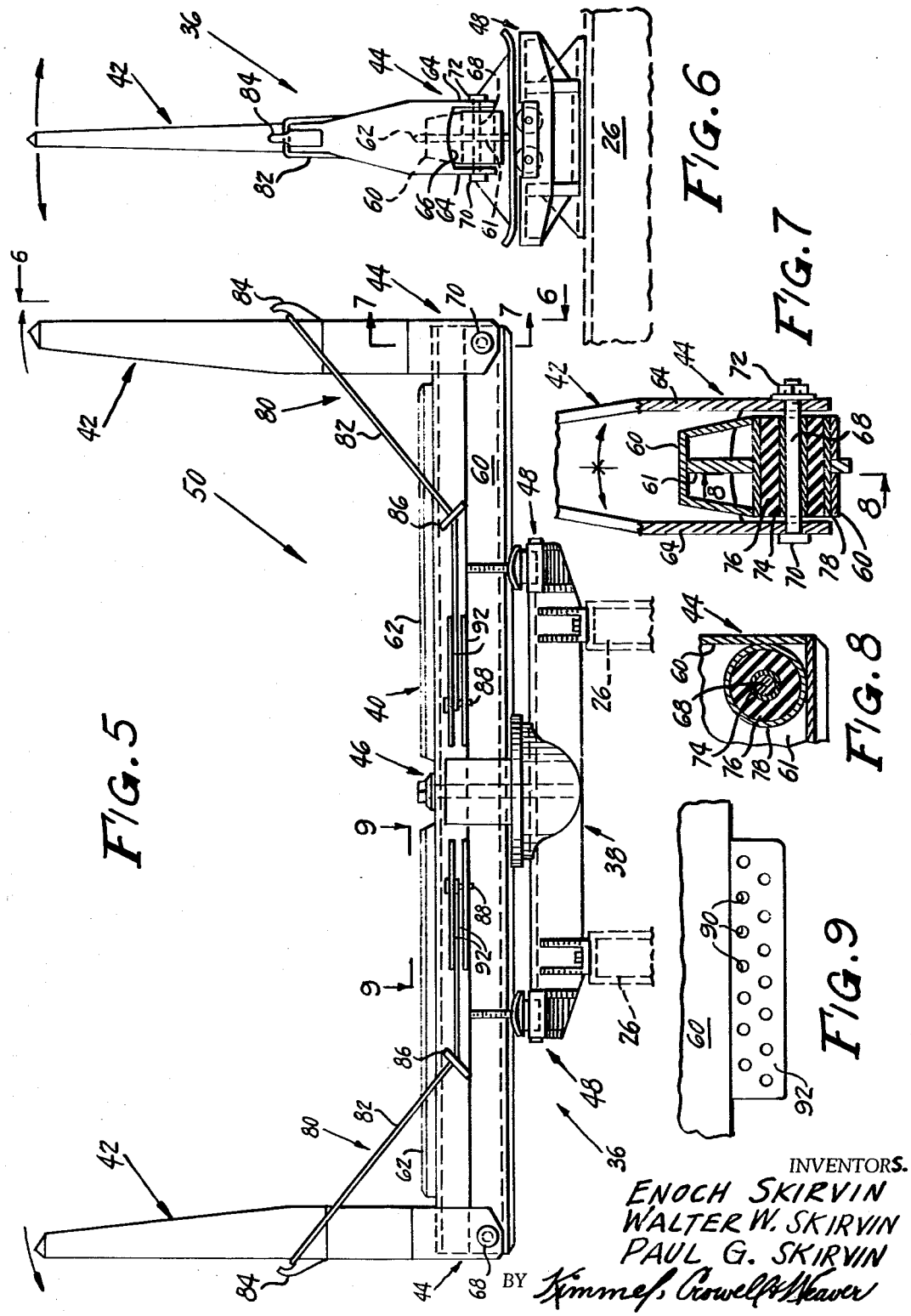

United States Patent Office 3,356,387
Patented Dec. 5, 1967

3,356,387
DOUBLY PIVOTED LOG BUNK STAKES FOR
ARTICULATED VEHICLES
Enoch Skirvin, Walter W. Skirvin, and Paul G. Skirvin,
all of Rte. 2, Box 1m, Philomath, Oreg. 97370
Filed Oct. 15, 1965, Ser. No. 496,260
5 Claims. (Cl. 280—404)

ABSTRACT OF THE DISCLOSURE

Means enabling the stakes of log bunks carried on a truck and trailer to yieldingly pivot in a plane generally paralleling the direction of travel of the truck and trailer against the biasing force to resist and lessen the imposition of high forces on the log bunk as the axis of the log road moves vertically during the movement of the truck and trailer over non-parallel ground planes.

---

This invention relates to log bunks, and more particularly to a log bunk adapted to be secured to a vehicle having generally upstanding laterally disposed bunk stakes.

The log bunk of the instant invention is particularly adapted to be secured to a trailer and is designed for carrying long and heavy articles, such as logs, beams of structural steel and the like. Log hauling units are normally composed of a truck and trailer connected by a pivotal connection allowing the unit to jackknife in a controlled manner about curves and when travelling over a hill or through a depression. It has been found that the axis of the load will rotate in a vertical plane with respect to the axis of the vehicle when travelling over a hill or through a depression.

The aforementioned shifting of the axis of the log road results in the imposition of high forces upon the log bunk, because of the rigid connection between the load, the log bunk, and the hauling unit.

It is an object of the instant invention to provide a log bunk constructed and arranged such that the axis of the load may rotate in a vertical plane with respect to the axis of the vehicle thereby lessening the imposition of axial forces on the bunk.

Another object of the instant invention is to provide a log bunk mounted generally crosswise on a truck-trailer unit providing laterally spaced log bunk stakes mounted for limited movement in a plane parallel to the direction of travel of the log hauling unit.

A more specific object of the instant invention is to provide a log bunk equipped with laterally spaced log bunk stakes resiliently mounted thereon for limited movement in a plane parallel to the general direction of travel of a log bunk unit.

Another more specific object of the instant invention is the provision of a mounting means between a log bunk stake and a transverse support including means for pivoting the log bunk stakes with respect to the support in two different planes of pivotal movement.

Other objects and advantages of the instant invention, as well as the invention itself, resides in the combinations of elements, arrangements of parts and features of construction and operation, all as will be more fully pointed out hereinafter and disclosed in the accompanying drawings wherein there is shown a preferred embodiment of this inventive concept.

In the drawings:

FIGURE 5 is a front elevational view of a log bunk stake assembled in accordance with the principles of the instant invention;

FIGURE 6 is a side elevational view of the log bunk stake of FIGURE 5 as may be seen from along lines 6—6 thereof viewing in the direction of the arrows;

FIGURE 7 is a cross-sectional view of the bunk stake and connection of FIGURES 5 and 6, taken substantially along line 7—7 of FIGURE 5 viewing in the direction of the arrows;

FIGURE 8 is a cross-sectional view of the connector of FIGURES 5 to 7 inclusive, taken substantially along line 8—8 of FIGURE 7 viewing in the direction of the arrows; and FIGURE 9 is a partial top plan view of the log bunk stake of FIGURE 5 taken substantially along line 9—9 thereof viewing in the direction of the arrows.

Figure 1:
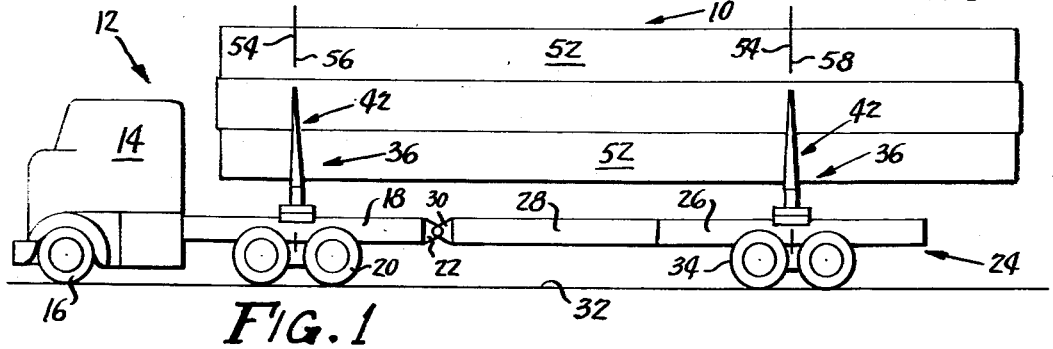
FIGURE 1 is a side elevational view of a log hauling unit travelling upon a substantially level vehicle supporting surface and equipped with the log bunk stakes of the instant invention.

Referring now to the drawings in detail, wherein like reference characters designate like elements throughout the several views thereof, there is indicated generally at 10 a log hauling unit including a tractor or truck shown generally at 12 having the customary cab 14, front wheels 16, rearwardly extending draft bar 18 carrying a plurality of load-supporting wheels 20 and a rearward pivotal connection 22 for engagement with a trailer. Log hauling unit 10 also includes a trailer designated generally at 24 providing a pair of spaced apart longitudinally extending structural members 26 releasably secured to pivotal connection 22 by a V-shaped draft tongue 28 which carries a pivotal connection 30. Trailer 24 is spaced from an underlying vehicle supporting surface 32 by a plurality of conventional wheels 34 mounted on members 26. As is apparent from a comparison of FIGURES 1 to 3 inclusive, pivotal connections 22, 30 provide for vertical pivotal movement between truck 12 and trailer 24 as well as providing for horizontal movement therebetween such as is convenient when rounding a curve.

Draft bar 18 and members 26 each carrying a log bunk designated generally at 36 having as its major components a stationary support indicated generally at 38, a movable support denominated generally at 40 carrying a bunk stake shown generally at 42 with a mounting means denominated generally at 44 providing for relative movement between the movable support 40 and bunk stake 42. A mounting means shown generally at 46 provides for rotatable movement between stationary support 38 and movable support 40 with a plurality of bearing means designated generally at 48 facilitating rotation therebetween. As may be seen in FIGURE 5, movable support 40 and bunk stakes 42 cooperate to form a log receiving area 50 in which is positioned a plurality of logs 52 as may be seen in FIGURES 1 to 3 inclusive.

Logs 52 are customarily loaded in log receiving area 50 in a pyramidal configuration such that bunk stakes 42 restrain the lowermost logs from lateral movement as will be more fully explained hereinafter. Chains are often used to connect bunk stakes 42 together across the top of the pyramidal configuration to firmly secure the load to log bunks 36. As may be seen most clearly in FIGURES 2 and 3, bunk stakes 42 are secured perpendicularly to the longitudinal axis of the log load as illustrated by a perpendicular load line 54. For purposes of illustration and discussion, a pair of lines 56, 58 are drawn perpendicular to the axis of truck 12 and trailer 24.

Figure 2:
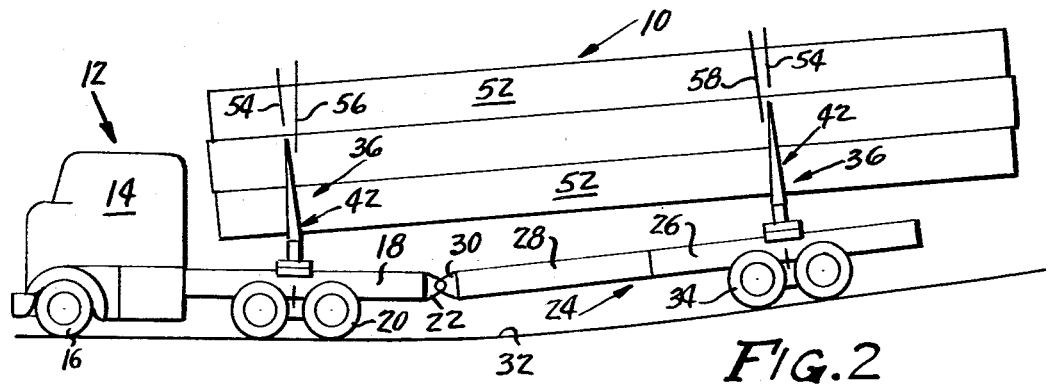
FIGURE 2 is a log hauling unit of the instant invention positioned upon a vehicle supporting surface that is changing from a downwardly sloping attitude to a substantially horizontal one.

As may be seen in FIGURE 1, the movement of log hauling unit 10 upon a vehicle supporting surface 32 having a constant slope results in the coincidence of perpendicular load line 54 of front log bunk 36 with perpendicular truck line 56 and the coincidence of perpendicular load line 54 of rear log bunk 36 with perpendicular trailer line 58. As may be seen in FIGURE 2, log hauling unit 10 is positioned at the bottom of a hill with the longitudinal axis of truck 12 and trailer 24 describing an upwardly facing V with perpendicular lines 56, 58 describing a pair of upwardly converging lines. On the other hand, perpendicular load lines 54 remain parallel in the shift of the axis of logs 52 with respect to truck 12 and trailer 24 as is apparent. This is of importance because the limited movement allowed by log bunks 36 results in mounting means 44 accommodating a portion of the forces created by the shifting load while rotatable mounting means 46 accommodates the remainder. In prior art devices, the rotatable securement means analogous to mounting means 46 must take the entire force produced by the shifting load.

Figure 3:
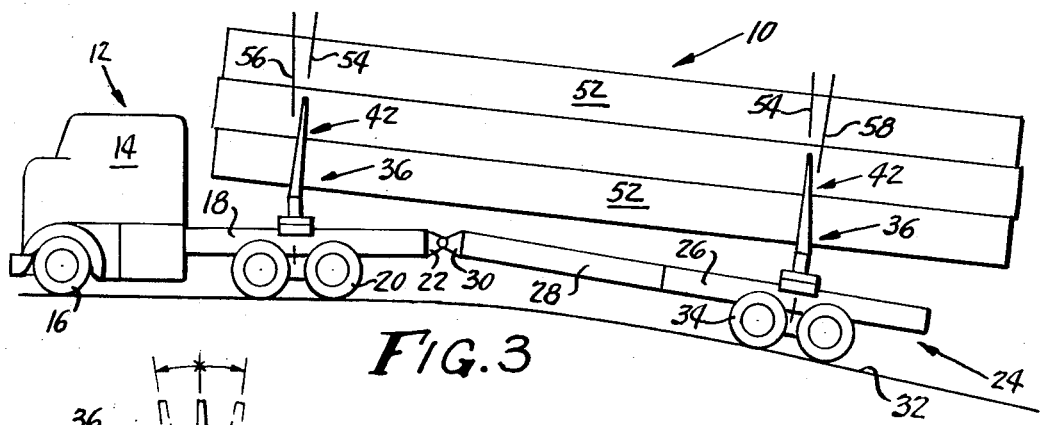
FIGURE 3 is a side elevational view of the log hauling unit of the instant invention positioned upon a vehicle supporting surface that undergoes a change in inclination from an upwardly inclined position to a substantially horizontal one.
Figure 4:
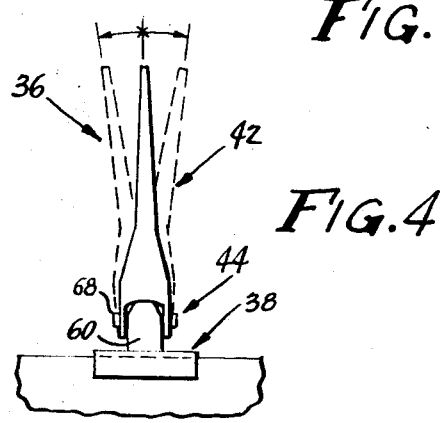
FIGURE 4 is an enlarged view of the log bunk stake of the instant invention illustrating in dashed lines the provision for pivotal movement in a plane substantially parallel to the direction of travel.

Referring now to FIGURE 3, the log hauling unit 10 is positioned at the apex of a hill with the axis of truck 12 and trailer 24 describing a downwardly facing V with perpendicular lines 56, 58 describing a pair of upwardly diverging lines. Perpendicular load lines 54 remain substantially parallel with mounting means 44 and rotatable mounting means 46 accommodating the forces produced by the shifting load similar to that mentioned with respect to the condition illustrated in FIGURE 2.

A minute description of all of the components of FIGURES 5 to 9 inclusive will not be undertaken, reference being made to the copending application filed, Ser. No. 496,261, filed Oct. 15, 1965 and concurrently herewith by the same inventors entitled Rotatable Log Bunk. Movable support 40 includes a box beam 60 having a substantially vertical strengthening plate 61 therein and a longitudinal axis crosswise of the general direction of travel of log hauling unit 10 and along which is positioned an elongate cleat 62 indenting into the bark of log 52 placed within receiving area 50 providing for the stability thereof.

Bunk stakes 42 include a pair of depending arms 64 surrounding the terminal ends of box beam 60 with a cutout 66 being provided therebetween below the upper end of box beam 60 thus substantially precluding rotational movement of stakes 42 toward the center of log bunk 36. Mounting means 44 also includes a pivot pin 68 provided with an enlarged head 70 on one end thereof and a threaded nut 72 at the other for releasably securing stake 42 to box beam 60. Closely surrounding pivot pin 68 is a metallic sleeve 74 which is in turn closely surrounded by a resilient bushing 76 preferably made of rubber or the like and a metallic bushing 78 fixed to box beam 60 and strengthening plate 61.

A pair of cable restraining means shown generally at 80 control the outward pivotal movement of bunk stakes 42 and include a pair of elongate cables 82 wrapped about bunk stakes 42 intermediate the height thereof and restrain against downward movement therealong by a hook-shaped member 84 as may be seen in FIGURES 5 and 6. Both ends of each cable 82 are strung through a rung 86 intermediate movable support 40 such that the inner portion of cable 82 is substantially parallel to box beam 60 with the outer portion thereof being upwardly inclined.

One end of each cable 82 is fastened to a bolt 88 received in a pair of vertically aligned apertures 90 in parallel horizontal plates 92 as may be seen most clearly in FIGURE 9. The other end of each of cables 82 is preferably equipped with a suitable cable tightening mechanism in a known manner. By providing the plurality of laterally spaced apertures 90, as shown in FIGURE 9, it will be seen that the outward pivotal movement of bunk stakes 42 may be readily controlled.

In the use of log bunk 36, logs 52 will be arranged in a pyramidal fashion in receiving area 50 with cable restraining means 80 being manipulated to position bunk stakes 42 vertical with respect to trailer 24 and truck 12 or outwardly inclined therefrom as conditions may compel. A chain or the like may be used to overlap logs 52 and connect the upper ends of bunk stakes 42 if desired. When a truck so equipped with a log bunk of the instant invention achieves the position shown in FIGURE 2, the forces created by the shifting load will result in the deformation of resilient bushing 76 providing limited movement of bunk stakes 42 which may be more specifically described as limited rotational movement about the axis of movable support 40. When log hauling unit 10 returns to the level position shown in FIGURE 1, resilient bushing 76 will assume its original shape such that perpendicular load lines 58 may coincide with perpendicular truck line 56 and perpendicular trailer line 58.

In utilizing the log bunk and log bunk stake of the instant invention, it should be apparent that a considerable amount of the forces created by the shifting of logs 52 is accommodated and dissipated by mounting means 44 with the remainder thereof being carried by mounting means 46 and bearing means 48 as will be apparent. It has been found that the construction of a mounting means connecting movable support 40 and bunk stake 42 should allow less than 12° movement from the vertical with about 8° providing a satisfactory compromise between the desire for movement and the necessity for strength.

It is now seen that there is herein provided an improved log bunk having all of the objects of this invention and others, including many advantages of great practical utility and commercial importance.

Since many embodiments may be made of the instant inventive concept, and since many modifications may be made of the embodiment hereinbefore shown and described, it is to be understood that the foregoing is to be interpreted merely as illustrative and not in a limiting sense.

We claim:
1. A log bunk comprising an elongate support having a longitudinal axis, a pair of elongate bunk stakes, means mounting each of said bunk stakes in spaced apart upstanding relation on said support for limited movement in a first plane perpendicular to said longitudinal axis, said mounting means including means rotatably mounting said stakes in a second plane perpendicular to said first plane, said mounting means comprising a pivot pin connecting said support and each of said stakes perpendicular to said second plane surrounded by a resilient bushing, said support and said stakes forming a log receiving area.

2. The structure of claim 1 including a rigid sleeve surrounding said pivot pin positioned between said pin and said resilient bushing.

3. The structure of claim 2 including a metallic bushing surrounding said pivot pin, said rigid sleeve and said resilient bushing, said metallic bushing being rigidly connected with said elongate support.

4. A log bunk comprising an elongate support having a longitudinal axis, a pair of elongate bunk stakes, means mounting each of said stakes in spaced apart upstanding relation on said support for movement in first and second planes perpendicular to one another, said means entirely comprising members surrounding one another and having axes extending parallel to one another and wherein at least one of said members is resilient, said support and said stakes forming a log receiving area.

5. In combination with a trailer vehicle having an axis directed generally along the direction of travel and a log bunk, said log bunk comprising an elongate support having a longitudinal axis, means connecting said support on said trailer in a position generally crosswise of said trailer axis, a pair of elongate bunk stakes, means mounting each of said bunk stakes generally perpendicular with respect to said trailer and in spaced apart relation on said support for limited movement in a first plane generally perpendicular to said longitudinal axis, said mounting means including means mounting each of said stakes for rotation about an axis generally parallel to the direction of travel, said mounting means including a first pivot pin connecting said support and each of said stakes and extending generally parallel to the direction of travel, a metallic sleeve surrounding said pivot pin, a resilient bushing surrounding said metallic sleeve, and a metallic bushing surrounding said resilient bushing and secured with said elongate support.

References Cited

UNITED STATES PATENTS

| | | | |
|---|---|---|---|
| 934,802 | 9/1909 | Fender | 105—38 |
| 1,073,892 | 9/1913 | Droste | 105—381 |
| 1,895,387 | 1/1933 | Linn | 280—145 |
| 2,559,007 | 7/1951 | Cliffe | 280—145 |
| 2,990,192 | 6/1961 | Leach | 280—145 |
| 3,027,959 | 4/1962 | Mailliard | 280—404 X |

FOREIGN PATENTS 83,541  4/1921  Austria.

LEO FRIAGLIA, *Primary Examiner.*